United States Patent [19]

Kröner

[11] Patent Number: 4,509,082
[45] Date of Patent: Apr. 2, 1985

[54] CIRCUIT ARRANGEMENT FOR GENERATING THE VERTICAL SYNCHRONIZING INFORMATION IN A MAGNETIC VIDEO TAPE APPARATUS

[75] Inventor: Klaus Kröner, Hamburg, Fed. Rep. of Germany

[73] Assignee: U.S. Philips Corporation, New York, N.Y.

[21] Appl. No.: 434,281

[22] Filed: Oct. 14, 1982

[30] Foreign Application Priority Data

Oct. 24, 1981 [DE] Fed. Rep. of Germany ....... 3142272

[51] Int. Cl.$^3$ .................. H04N 5/93; H04N 5/94; H04N 5/782
[52] U.S. Cl. ............................... 360/37.1; 360/38.1; 360/64
[58] Field of Search .................... 360/37.1, 38.1, 64; 358/319, 314

[56] References Cited

U.S. PATENT DOCUMENTS

| | | | |
|---|---|---|---|
| 3,322,892 | 5/1967 | Yasuoka et al. | 360/37.1 |
| 3,407,266 | 10/1968 | Arafi et al. | 350/38.1 |
| 3,573,359 | 4/1971 | Guisinger | 360/37.1 |
| 3,767,849 | 10/1973 | Wessels | 360/38.1 |

Primary Examiner—Raymond F. Cardillo, Jr.
Attorney, Agent, or Firm—Thomas A. Briody; William J. Streeter; Edward W. Goodman

[57] ABSTRACT

In magnetic video-tape equipment of the helical-scan type the vertical synchronizing information is situated at the beginning of a track near the edge of the magnetic tape. When the edge portion of the magnetic tape does not cooperate correctly with the head in the case of a faulty magnetic tape or apparatus, the vertical synchronizing information is not scanned and the resulting picture will roll in a vertical direction. However, since the beginning of a track coincides with the edges of the head-change signal, the vertical synchronizing information, in accordance with the invention, is always derived from the head-change signal, i.e. even during normal undisturbed operation, and is added to the CVBS signal, the signal scanned from the magnetic tape being blocked during this time. For this purpose the edge of the head-change signal is delayed and this delay is controlled so that normally the generation of the vertical synchronizing information from the line-pulse signals which are synchronized with the preceding track starts halfway between two such line-pulse signals or their active edges. Also when the permissible phase shift to the head change signal relative to the line-pulse signal upon each head change is taken into account the vertical synchronizing information always starts an equal number of half-line periods after the beginning of a track, thereby precluding a vertical picture jump, not even by half a line period.

9 Claims, 5 Drawing Figures

CIRCUIT ARRANGEMENT FOR GENERATING THE VERTICAL SYNCHRONIZING INFORMATION IN A MAGNETIC VIDEO TAPE APPARATUS

BACKGROUND OF THE INVENTION

The invention relates to a circuit arrangement for generating the vertical synchronizing information in a magnetic video-tape apparatus in which the magnetic tape is at least partly wrapped around a rotating head-support and the head support carries one or more magnetic heads which are uniformly spaced over the circumference of the head support, which magnetic heads consecutively write or scan adjacent tracks on the magnetic tape which tracks are inclined relative to the longitudinal axis of the magnetic tape and each contain the information of one field and at a predetermined small distance from the edge of the magnetic tape contain the vertical synchronizing information, a track-change signal being generated, which signal is synchronized with the head-support rotation and indicates a track change, and which apparatus further comprises a line-pulse generator for generating a line-pulse signal, which generator is synchronized by the horizontal synchronizing pulses in the video information.

Such magnetic video tape equipment is generally known and is described in, for example, "Heimvideotechnik" (Special Issue of Funkschau), Franzis-Verlag 1979 on pages 5 to 10. Since the tracks not only contain the picture information but also the complete synchronizing information, the signal which is read from the tracks during playback and which is demodulated in the video processing circuit constitutes the complete CVBS signal which is applied to a television set for reproducing the picture information.

In practice it may happen that at least locally the edge of the magnetic tape is damaged or stretched, resulting in curled edges or folded portions parallel to the edge of the magnetic tape, which may be caused by faults in the manufacture of the magnetic tape or by the use of the magnetic tape in an apparatus which is not in good condition. As a result of this, it is not possible to scan the vertical synchronizing information from these damaged locations of the tape, so that the picture reproduced on the television set is not synchronized and "rolls".

SUMMARY OF THE INVENTION

It is the object of the invention to ensure that even if no vertical synchronizing information is scanned from the tape, a stationary picture is obtained on a television set to which the video signal being scanned from the magnetic tape, is applied during playback.

According to the invention this object is achieved in that a delay means derives a starting signal from the delayed track-change signal, which starting signal starts a vertical-synchronizing generator for deriving the vertical synchronizing information for the video signal processing circuit from the line-pulse signal, and a phase comparator controls the delay time of the delay means in such a way that the starting signal coincides with a specific phase range of one of the line pulses, which range is situated between two ranges of the line-pulse signal in which the vertical-synchronizing generator is active. Thus, not only in the event of a disturbance but also during normal operation, the compositive CVBS signal applied to the television set is in principle formed both by the information scanned from the tape and by the vertical synchronizing information generated by the additional circuitry. In order to preclude interference during normal operation when the vertical synchronizing information is also read from the magnetic tape, the information read from the tape is blocked upon every track change for at least the duration of the generated vertical synchronizing information and then the vertical synchronizing information which is scanned from the tape after blocking is converted, for example by differentiation, into signals which correspond to the horizontal synchronizing information. In particular after a phase jump, upon the track change, the synchronization of the television set can start at the earliest possible instant in the phase of the horizontal synchronizing information scanned from the track.

Since the location of the track which contains the vertical synchronizing information after the tape edge or after the track-change signal may be shifted by several lines relative to a nominal value, which shift however is constant during many consecutive tracks, while the vertical synchronizing information generated in accordance with the invention always starts at a specific time after the track change, the vertical synchronizing information thus generated may give rate to a vertical shift of the picture by a few lines. However, this shift is constant and therefore hardly perceptible and, moreover, the edge of the picture generally contains no essential information. Also, since the vertical synchronizing information is, in principle, added to the signal scanned by the magnetic heads or in, principle, replaces the beginning of the track information, the change-over to the vertical synchronizing information derived from the track-change signal will not give rise to a vertical phase jump when no vertical synchronizing information is scanned from the magnetic tape.

When changing from one track to another, a maximum phase jump of a quarter line period in either direction is allowed. By controlling the delay in such a way that the starting signal is situated between two ranges of the line-pulse signal in which the generator for the vertical synchronizing information is active, it is achieved that the generated vertical synchronizing information always starts an equal number of lines after the scanning of a new track begins, thereby precluding that the picture jump by one line, or by half a line in the case of a line-pulse signal of twice the line frequency.

A simple control of the delay of the track-change signal, in order to generate the starting signal, is obtained in that the delay means comprises a charging and discharging current generator, whose current value is controlled by the phase comparator, and a capacitor which is connected to said generator via a switch which is controlled by the track-change signal, which capacitor is also connected to the input of a threshold switch having a fixed threshold, which threshold switch supplies the starting signal. This results in an accurate control of the delay time by simple means.

For a simple control of the vertical synchronizing generator and the phase comparator it is effective if the starting signal is a short pulse. Such a short pulse can be generated effectively by the delay means described in the foregoing in that the threshold switch has two threshold values and supplies an output signal of a first value when the voltage across the capacitor exceeds the first threshold value and supplied an output signal of a second value when the voltage across the capacitor has not yet exceeded the first threshold value or has exceeded the second threshold value, the threshold values being selected so that the duration of the output signal of the first value, which output signal forms the starting signal, is smaller than the duration of one line pulse. These two different threshold values can be processed by means of two comparators, the comparator for the lower threshold actuating the comparator for the upper threshold.

A further embodiment of the invention is characterized in that the phase comparator compares the phase of the generated starting signal and that of the line-pulse signal.

For the phase comparators various circuit arrangements are known. In the present case, however, the starting signals, which occurs only once for a very small fraction of each field, should be compared with a periodically recurring signal. In a further embodiment of the invention this is achieved in an effective manner in that the phase comparator comprises two switchable current sources of opposite polarity, which sources are operative during the starting signal, a further capacitor is connectable to the current source of the one or the other polarity via a further switch, the line-pulse signal controls the further switch, and the voltage across the further capacitor controls the delay time of the delay means. Suitably, the capacitor has such a high capacitance that during one field it is charged or discharged to a very small extent only as a result of the control of the delay means.

After the magnetic video tape apparatus has been switched to the playback mode it may happen that, as a result of the starting process, the phase comparator or the delay means operates near one end of its control range, so that, in the case of small phase jumps upon a track change, the control range is exceeded and the picture consequently jumps one line. In order to preclude this, a further embodiment of the invention is characterized in that a detection device is connected to the further capacitor, which device sets the voltage across the further capacitor to an average value when the voltage across the further capacitor exceeds an upper limit value and when said voltage decreases below a lower limit value, the difference between the upper and the lower limit corresponding to a variation of the delay time of the delay means by more than the interval between two line pulses. In this way it is ensured that the control signals of the phase comparator and the delay means are always substantially in the middle of the control range.

DESCRIPTION OF THE DRAWINGS

Embodiments of the invention will now be described in more detail, by way of example, with reference to the drawings. In the drawings.

DESCRIPTION OF THE PREFERRED EMBODIMENT

Figure 1:
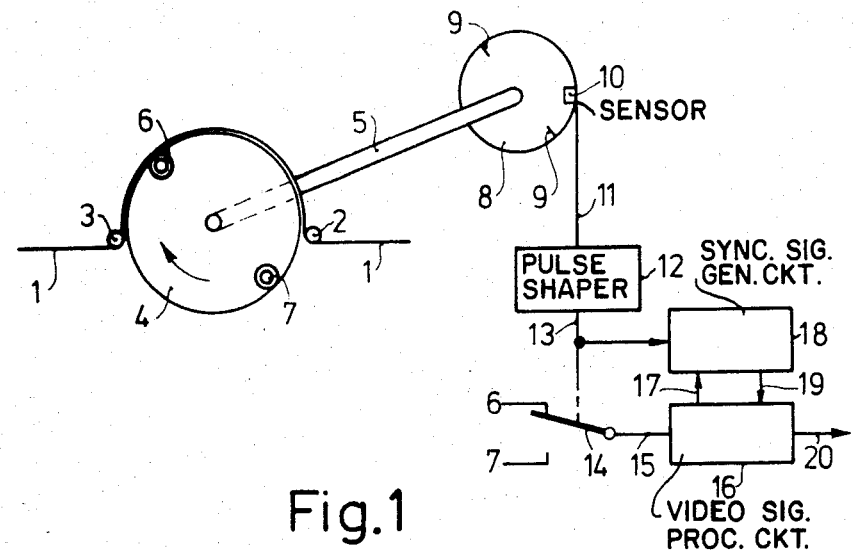
FIG. 1 shows the cooperation between some mechanical and electronic sections of a magnetic video tape apparatus.

FIG. 1 shows a shaft 5 carrying the head support 4 and a marking disc 8. The shaft 5 is driven by a drive means (not shown) so that the head support 4 and the disc 8 rotate in the direction indicated by the arrow. Two magnetic heads 6 and 7 are arranged diametrically opposite each other on the head support 4 while the disc 8 comprises two markers 9, which correspond to the positions of the magnetic heads 6 and 7 and which are sensed by a sensor 10.

Figure 2:
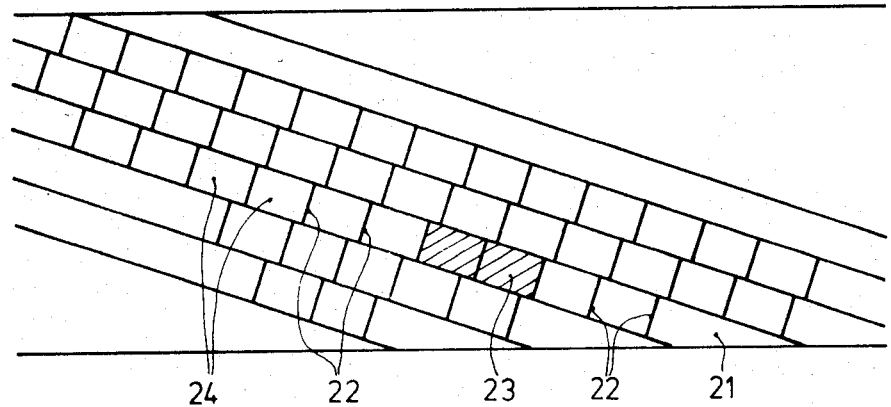
FIG. 2 shows the configuration of the tracks and the information contained in said tracks on the magnetic tape.

A magnetic tape 1, which is passed around two guide rollers 2 and 3, is wrapped around the circumference of the head support 4 over at least 180° with an axial offset, so that during rotation of the head support 4 with a high speed and transport of the magnetic tape 1 with a comparatively low speed the magnetic heads 6 and 7 record or scan tracks which extend obliquely on the magnetic tape, as is shown in FIG. 2.

These parallel adjoining tracks 21 extend at an acute angle relative to the edge of the magnetic tape 1. Each track 21 contains the information of one field and starts with horizontal synchronizing information 22 followed by vertical synchronizing information 23. In FIG. 2 the last-mentioned information is situated very close to the lower edge of the magnetic tape 1, because the track configuration has not been drawn to scale. In fact, the vertical synchronizing information 23 has a length of, for example, five times half a line period, to which strictly speaking, for example, five preceding and following horizontal synchronizing signals spaced by half a line period must be added. After the vertical synchronizing information 23 followed by some blank lines, the information 24 for the consecutive lines of the picture to be formed occurs, separated by horizontal synchronizing signals 22. Thus, each track 21 contains the complete CVBS signal for one field.

The sensor 10, for sensing the markers 9 of the marking disc 8, is arranged so that it detects a marker 9 each time when one of the magnetic heads 6 or 7 just begins to scan a new track on the magnetic tape 1. The signal detected by the sensor 10 is applied to a pulse-shaper stage 12 via the line 11, which stage produces a squarewave signal on the output 13, which signal changes each time that a marker is detected and consequently each time that the scanning changes from one track on the magnetic tape 1 to another. This squarewave signal on the output 13 is therefore referred as the track-change signal. When a plurality of magnetic heads are used, such as the magnetic heads 6 and 7 in the present example, this track-change signal controls their change-over and is therefore also referred to as the head-change signal. It is to be noted that the rotation of the head support is controlled by a quartz oscillator, so that when no marking disc 8 is used the head-change signal may be derived directly from this quartz oscillator.

The signals from the magnetic heads 6 and 7 are applied to the two change-over contacts of an electronic switch 14 for example via rotary contacts, which switch is controlled by the head-change signal on the line 13 and connects the magnetic head which is situated at the location where the magnetic tape 1 is wrapped around the head support, to a video-signal processing circuit 16 via the line 15. In this circuit 16 the frequency-modulated video signal scanned by the magnetic heads 6 and 7 is demodulated and amplified, resulting in a standard CVBS signal which, via the output 20 of the circuit 16, is applied to a television set for reproducing the picture information. Since each track also contains the complete synchronizing information both for the horizontal deflection and for the vertical deflection, the scanned picture information may be transferred directly, without the addition of any further information, after the said demodulation and amplification. The circuit 16 comprises a line-pulse generator, not shown, which generates a line-pulse signal, or a half-line pulse signal of twice the line frequency, the generator being phase-controlled by the horizontal synchronizing information scanned from the track and operating in a comparatively stable manner even if the information from the magnetic tape drops out.

As a result of a defective tape or apparatus, it may happen that the edges of the magnetic tape cannot cooperate correctly with the magnetic heads 6 and 7, so that the edge portions containing the vertical synchronizing information are not scanned correctly. The signal on the output 20 of the video signal processing circuit 16 then does not contain any vertical synchronizing information, so that the television set to which the apparatus is connected can no longer produce a stationary picture.

Therefore, there is provided a circuit 18, which receives the head-change signal via the line 13 and the half-line pulse signal generated by the line pulse generator in the circuit 16 via the line 17, from which it derives a vertical synchronizing signal which appears simultaneously with the vertical synchronizing signal which is situated at the specified location on the magnetic tape and which is scanned correctly. This additional vertical synchronizing information generated by the circuit 18 is applied to the circuit 16 via the line 19 and replaces the instantaneous vertical synchronizing information scanned from the magnetic tape. Thus, the vertical synchronizing information scanned from the magnetic tape is not used. It is advantageous if, after a head change, i.e. after the condition of the track-change signal in the circuit 16 has changed, the synchronizing information read from the magnetic tape is blocked and the horizontal synchronizing information is replaced by the half-line pulse signal from the line-pulse generator, which signal is simply divided, and the vertical synchronizing information is replaced by the information on the line 19 from the circuit 18. After a time interval in which, even within the specified tolerances, no more vertical synchronizing information can be obtained from the tape it is again possible to switch back to the signal scanned from the magnetic tape. This may also be effected directly after the end of the vertical synchronizing information generated in the circuit 18 if, for example by pulse shaping such as by means of differentiators, all the synchronizing information scanned from the magnetic tape, i.e. also any vertical synchronizing information appearing subsequently, is converted into narrow pulses corresponding to the horizontal synchronizing pulses. The last-mentioned possibility has the advantage that the horizontal synchronizing information scanned from the tape can synchronize the horizontal deflection of the television set at an earlier instant before the picture information begins, which is especially important in the case of a larger phase jump of the horizontal synchronizing information after a track change. In any case, if as a result of one of the said faults the vertical synchronizing information from the magnetic tape drops out, the reproduced signal will not change and, in particular, will not exhibit a picture jump in a vertical direction.

The vertical synchronizing information comprises a number of pulses whose duration corresponds to substantially half a line period, which pulses are spaced from each other within the video information with half the spacing of the horizontal synchronizing information. In the simplest case the vertical synchronizing information generated in the circuit 18 may be derived from the line pulse signal on the line 17 by means of a counter which is started by the head-change signal on the line 13 and which counts a specific number of half-line pulses before it generates a further number of vertical synchronizing pulses. However, it must then be taken into account that the phase relationship of the head-change signal with the horizontal synchronizing pulses on the magnetic tape is subject to a tolerance and moreover may vary up to 16 μs, i.e. a quarter line, to either side upon a track change. If the phase relationship of the head-change signal with half-line pulse signal happens to be unfavourable, the counter which counts a number of half-line pulses before it generates the vertical sync information, may supply vertical synchronizing information which is shifted by half a line relative to the picture information for two consecutive fields. Since this small horizontal picture jump may be annoying, the delay between the beginning of the head-change signal and the beginning of the generation of the vertical synchronizing information is controlled so that this delay falls substantially halfway between two half-line pulse signals, so that no picture jump of half a line can occur upon a head change.

Figure 3:
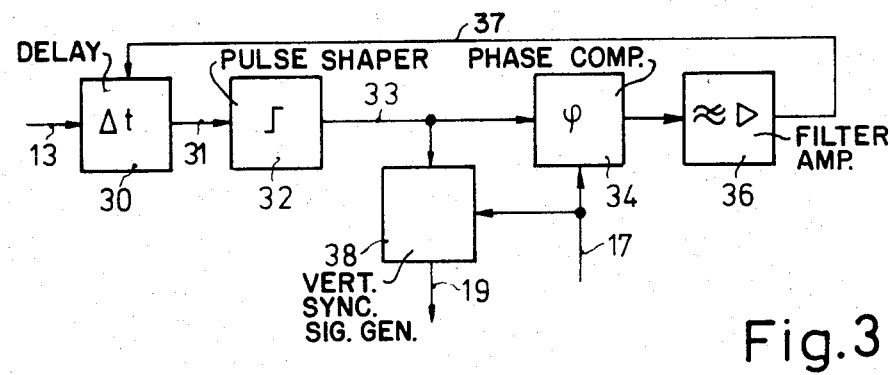
FIG. 3 shows a circuit arrangement in accordance with the invention, comprising a control circuit with a delay means and a phase comparator.

This is achieved by designing the circuit 18 as shown in FIG. 3. In this circuit a delay means 30 receives the head-change signal via the line 13 and transfers this signal, or its edges, to the output 31 with a delay. The delay of the edge of the head-change signal in the delay circuit 30 can be controlled by a signal via the line 37.

The delayed signal on the line 31 is applied to a pulse shaper 32, which produces a brief squarewave signal on the line 33 which is connected to the starting input of a vertical synchronizing generator 38. This generator 38 also receives the half-line pulse signal via the line 17. Upon the next half-line pulse, or the next edge of this pulse, after the appearance of a starting signal on the line 33, the generator 38 starts to generate the vertical synchronizing information in the specified form in synchronism with the half-line pulse signal. Since, as already stated, the half-line pulse signal on the line 17 has twice the line frequency, the vertical synchronizing information comprises a plurality of pulses with a spacing equal to half the line period, the generator 18 may simply comprise counters which are started by the starting signal on the line 33 and which are advanced by the half-line pulse signal applied via the line 17. The vertical synchronizing pulses are then derived from the individual counter positions and are available on the output 19. After the complete vertical synchronizing information has been generated, the counters in the generator 38 are reset and remain in this condition until the next starting signal appears. The exact circuit arrangement of the vertical synchronizing generator 38 will be obvious to those skilled in the art and is therefore not described in more detail.

The starting signal produced on the line 33 by the pulse shaper 33 is also applied to a phase comparator 34, which compares this starting signal with the half-line pulse signal on the line 17. The output signal of the phase comparator 34, which corresponds to the phase difference between the starting signal of the line 33 and the half-line pulse signal, appears on the line 35 and is applied to a circuit 36 comprising a low-pass filter and an amplifier. A slowly varying signal then appears on the line 37, which signal represents the average value of the phase differences between the starting signal and the half-line pulse signal during a number of preceding periods and controls the amount of delay in the delay means 30 in such a way that this phase difference is set to a predetermined value. This predetermined value is the middle of a line pulse and is situated at a suitable distance from the edges of the line pulse signals, which edges advance the counters in the vertical synchronizing generator 38. As a result of this, the vertical synchronizing generator 38 is always started immediately before the same half-line pulse signal upon a track change, so that the track change does not give rise to a vertical picture jump.

Figure 4:
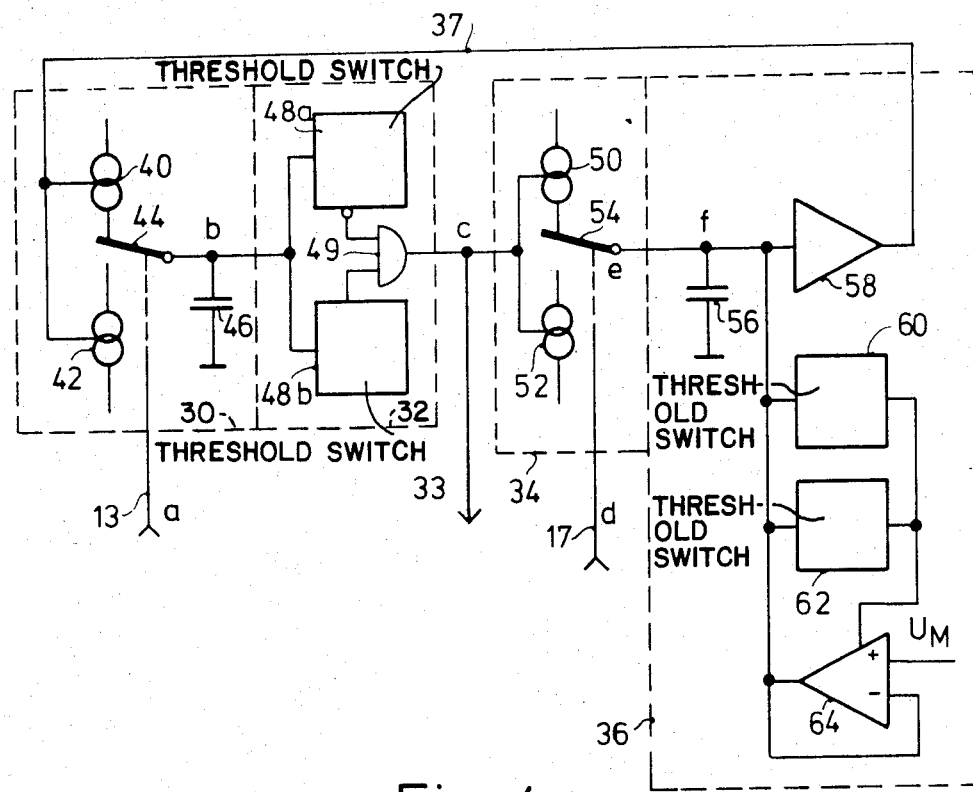
FIG. 4 is a more detailed circuit diagram of the circuit arrangement in accordance, with the invention shown in FIG. 3, FIG. 5, consisting of a-f, is a diagram showing the voltage variations on some points of the circuit arrangement shown in FIG. 4.

FIG. 4 shows the circuit arrangement of FIG. 3 in more detail. The delay means 30 comprises two current generators 40 and 42, which generate equal currents of opposite polarity. The values of these two currents are controlled in the same sense by a signal via the line 37, i.e. the two currents decrease or increase to the same extent in response to a variation of the signal on the line 37.

The outputs of the two current generators 40 and 42 are connected to a switch 44 which is controlled by the head-change signal on the line 13. In one of the signal conditions of the head-change signal, i.e. when one of the two magnetic heads scans the magnetic tape, the switch 44 is, for example, in the position shown, so that the capacitor 46 connected to the switch is charged starting from an initial value. Normally, this charging process has a duration which preferably corresponds to 16 picture lines. After this, the voltage across the capacitor 46, and consequently that on the output of the current generator 40, is so high that this generator 40 is saturated and the current ceases to flow. Consequently, the current generator 40 forms the charging-current generator. If subsequently the head-change signal on the line 13 changes to another value, the switch 44 is set to the lower position and the capacitor 46 is discharged via the discharging-current generator 42 until the voltage has become so low that the current generator 42 is saturated and no more current flows. This voltage value is the initial value at which charging of the capacitor 46 begins.

This increasing or decreasing voltage across the capacitor 46 upon each head change is applied to the pulse shaper stage 32, which comprises two comparators or threshold switches 48a and 48b, which switch over at slightly different threshold values. The two threshold values are situated in the middle of the range of the voltages which can appear across the capacitor 46. Assuming that the switch 48b is switched over at the lower threshold value and that the voltage across the capacitor 46 increases, switch 48b will supply an output signal to the one input of the AND-circuit 49 if the voltage across the capacitor 46 exceeds this lower threshold value. As a result of the inversion of the output of the switch 48a the other input of the AND-circuit 49 also receives a signal, so that an output signal which forms the starting signal is produced on the line 33. If the voltage across the capacitor 46 now increases further, the upper threshold value of the switch 48 is also exceeded ad the AND-circuit 49 is blocked again, so that the starting signal on the line 33 is terminated.

Figure 5:
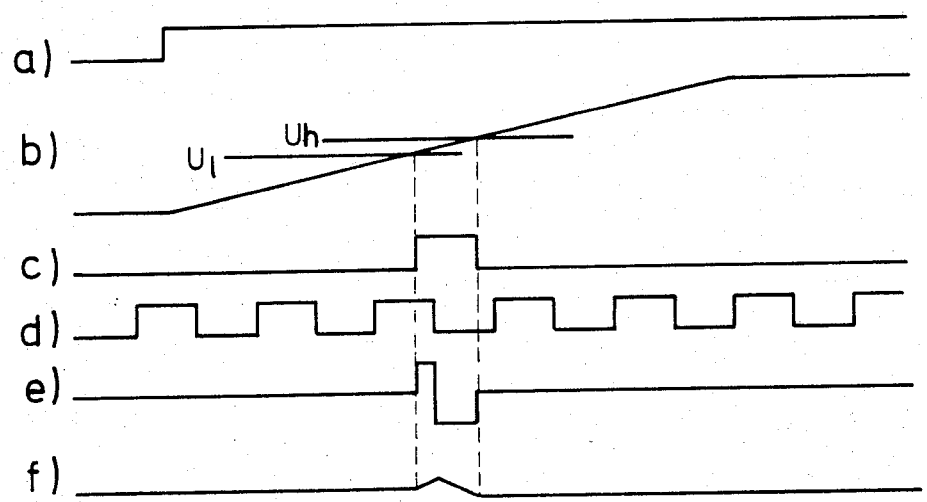

FIG. 5 is a timing diagram representing this process. Line a represents the head-change signal, which exhibits a transition from low to high. At this transition the charging of capacitor 46 begins, the voltage across this capacitor being shown on the line b. As soon as this capacitor voltage exceeds the lower threshold value $U_l$ the starting signal shown on the line c assumes a high value. If subsequently the voltage across the capacitor 46 exceeds the upper threshold value $U_h$ the starting signal is terminated again. Charging of the capacitor 46 then continues until an upper limit value is reached. It is evident that during discharging the same process takes place in the reverse sequence, so that again a starting signal of the same shape is produced, which has the same distance from the beginning of the high-to-low transition in the track change signal if the two threshold values $U_l$ and $U_h$ are exactly symmetrical relative to the lowest and highest voltage across the capacitor 46 after complete charging or discharging.

The starting signal on the line 33 in FIG. 4 is applied to the vertical synchronizing generator 38 in FIG. 3 which, in addition to the phase comparator 34, is shown again in FIG. 4. This comparator 34 comprises two current sources 50 and 52 which supply currents of opposite polarity and which are switched on by the starting signal. The outputs of the two current generators 50, 52 are connected to a switch 54 which is actuated by the half-line pulse signal on the line 17. This switch 54 is connected to a capacitor 56, having a comparatively high capacitance, in the low-pass filter and amplifier 36.

FIG. 5 also shows the processes in the phase comparator 34 and the low-pass filter 36 as a function of time. Line c represents the half-line pulse signal on the line 17, which signal is not drawn to the correct time scale because in fact the time interval between the signal transition of the head-change signal on the line a and the starting signal c corresponds to 16 half-line pulse signals of twice the line frequency of the picture to be reproduced. If the half-line pulse signal is high, the switch 54 may also be in the upper position and vice versa. As a result of this, the output current of the switch 54, which current is represented on the line e, changes from a positive value, corresponding to the current from the current source 50, upon the change of the condition of the line-pulse signal, to a negative value corresponding to the current from the current source 52. It is assumed that the currents from the current sources 50 and 52 are substantially equal. However, as a result of the phase relationship between the half-line pulse signal and the starting signal the durations of the positive and negative currents are not equal.

The voltage across the capacitor 56 is shown on the line f, which voltage increases during the positive current but, as a result of the long duration of the negative output current of the switch 54, it decreases below the previous value. In FIG. 4 the voltage across the capacitor 56 is applied to the charging and discharging current generators 40 and 42 via the amplifier 58 and the line 37 and causes the generator currents to increase, so that after the next signal transition of the head-change signal, recharging of the capacitor 46 is effected at a faster rate and the starting signal appears earlier, as a result of which the two current components shown on the line e in FIG. 5 are substantially equal. It is evident that in the case of a premature starting signal, the same process occur but with inverted signs, i.e. the voltage across the capacitor 56 which forms the low-pass filter increases and thereby reduces the currents from the current generators 40 and 42, so that subsequently the capacitor 46 is recharged more slowly and the starting signal will have a greater delay relative to the signal transition of the head-change signal. This always results in a phase relationship for which the starting signal, whose duration is assumed to be substantially equal to half the period of the half-line pulse signal (twice the line frequency), i.e a duration of, for example, approximately 16 μs, is situated symmetrically relative to the negative edge of the line-pulse signal, for the leading edge of the starting signal is situated halfway between two edges of the symmetrical half-line pulse signal.

In order to achieve this situation, the maximum voltage variation across the capacitor 56 should be capable of shifting the starting signal by at least one period of the half-line pulse signal. However, this is valid only if in the locked-in condition, the voltage across the capacitor 56 is halfway between these two limit values. Upon locking in, after the apparatus has been switched on, it may happen that in the locked-in condition, the voltage across the capacitor 56 has a value close to the upper or the lower control limit, so that adequate control is no longer possible to one side and the pull-in range is overstepped, which may give rise to a vertical picture jump of half a line. In order to preclude this the amplifier 58 is dimensioned in such a way that the maximum voltage variation across the capacitor 56 produces a shift of the starting signal by more than one period of the half-line pulse signal and moreover there is provided a circuit, comprising the threshold switches 60 and 62 and an amplifier 64, which always brings the signal across the capacitor 56 back into range between the two possible limit values.

The threshold switch 60 compares, for example, the voltage across the capacitor 56 with a threshold value near the upper limit of this capacitor voltage and supplies a signal when this threshold value is exceeded. Similarly, the threshold switch 62 compares the voltage across the capacitor 56 with a lower threshold value near the lower limit and supplies a signal when the voltage drops below this lower threshold value. In both cases the amplifier 64 is switched on and sets the voltage across the capacitor 56 to an average value $U_m$. The amplifier 64 may be turned off in that for example the two threshold switches 60 and 62 have a suitable hysteresis. Resetting the voltage across the capacitor 56 via the amplifier 64 gives rise to a non-recurrent vertical picture jump, but this jump occurs directly after switching on so that it is hardly perceptible. Subsequently, the further control process proceeds on the basis of said average value, so that there is no longer any risk that a limit value is reached during the control process. This ensures that no vertical picture jump can occur during normal operation.

What is claimed is:

1. A circuit arrangement for generating the vertical synchronizing information in a magnetic videotape apparatus in which the magnetic tape is at least partly wrapped around a rotating head-support and the head support carries one or more magnetic heads which are uniformly space over the circumference of the head support, which magnetic heads consecutively write or scan adjacent tracks on the magnetic tape, which tracks are inclined relative to the longitudinal axis of the magnetic tape and each contain the information of one field and at a predetermined small distance from the edge of the magnetic tape contain the vertical synchronizing information, a track-change signal being generated, which signal is synchronized with the head-support rotation and indicates a track change, and which apparatus further comprises a video signal processing circuit for demodulating and amplifying the information from said magnetic heads, said video signal processing circuit including a line pulse generator for generating a line-pulse signal, which generator is synchronized by the horizontal synchronizing pulses in the video information, characterized in that said circuit arrangement comprises adjustable delay means for deriving a starting signal from the track-change signal, a vertical synchronizing generator coupled to said delay means for generating vertical synchronizing information for the video signal processing circuit from the line-pulse signal in substitution for that contained in said scanned tracks, and a phase comparator arranged to receive the starting signal and the line-pulse signal for controlling the delay time of the delay means such that the starting signal coincides with a phase range of a specific one of the line pulses, which phase range is situated between starting edges of two pulses in the line-pulse signal in which the vertical synchronizing information in said scanned tracks should occur.

2. A circuit arrangement as claimed in claim 1, characterized in that said delay means comprises a charging and discharging current generator whose current value is controlled by said phase comparator (46), and a capacitor (46) which is connected to said generator via a switch which is controlled by the track-change signal, which capacitor is also connected to the input of a threshold switch having a fixed threshold, which threshold switch supplies the starting signal.

3. A circuit arrangement as claimed in claim 2, characterized in that the threshold switch has two threshold values and supplies an output signal of a first value when the voltage across the capacitor exceeds the first threshold value and supplies an output signal of a second value when the voltage across the capacitor has not yet exceeded the first threshold value or has exceeded the second threshold value, the threshold values being selected so that the duration of the output signal of the first value, which output signal forms the starting signal, is smaller than the duration of one line pulse.

4. A circuit arrangement as claimed in claim 3, characterized in that the phase comparator comprises two switchable current sources of opposite polarity, which sources are operative during the starting signal, and a further capacitor alternatively connected to the current sources via a further switch, the further switch being controlled by the line-pulse signal, and the voltage across the further capacitor controlling the delay time of the delay means.

5. A circuit arrangement as claimed in claim 4, characterized in that a detection device is connected to the further capacitor, which detection device sets the voltage across the further capacitor to an average value when the voltage across the further capacitor exceeds an upper limit value and when said voltage decreases below a lower limit value, the different between the upper and the lower limit value corresponding to a variation of the delay time of the delay means by more than the interval between two line pulses.

6. A circuit arrangement as claimed in claim 2, characterized in that the phase comparator comprises two switchable current sources of opposite polarity, which sources are operative during the starting signal, and a further capacitor alternatively connected to the current sources via a further switch, the further switch being controlled by the line-pulse signal, and the voltage across the further capacitor controlling the delay time of the delay means.

7. A circuit arrangement as claimed in claim 6, characterized in that a detection device is connected to the further capacitor, which detection device sets the voltage across the further capacitor to an average value when the voltage across the further capacitor exceeds an upper limit value and when said voltage decreases below a lower limit value, the different between the upper and the lower limit value corresponding to a variation of the delay time of the delay means by more than the interval between two line pulses.

8. A circuit arrangement as claimed in claim 1, characterized in that the phase comparator comprises two switchable current sources of opposite polarity, which sources are operative during the starting signal, and a further capacitor alternatively connected to the current sources via a further switch, the further switch being controlled by the line-pulse signal, and the voltage across the further capacitor controlling the delay time of the delay means.

9. A circuit arrangement as claimed in claim 8, characterized in that a detection device is connected to the further capacitor, which detection device sets the voltage across the further capacitor to an average value when the voltage across the further capacitor exceeds an upper limit value and when said voltage decreases below a lower limit value, the difference between the upper and the lower limit value corresponding to a variation of the delay time of the delay means by more than the interval between two line pulses.

* * * * *